(12) United States Patent
Wei

(10) Patent No.: US 7,703,814 B2
(45) Date of Patent: Apr. 27, 2010

(54) UNIVERSAL QUICK CONNECTION UNIT FOR CONNECTING PIPE TO HYDRAULIC OR PNEUMATIC TOOL

(76) Inventor: Chung-Chih Wei, No. 33, Xizhou W. Rd., Taiping City, Taichung County 411 (TW)

( * ) Notice: Subject to any disclaimer, the term of this patent is extended or adjusted under 35 U.S.C. 154(b) by 0 days.

(21) Appl. No.: 12/326,952

(22) Filed: Dec. 3, 2008

(65) Prior Publication Data
US 2009/0146416 A1 Jun. 11, 2009

(30) Foreign Application Priority Data
Dec. 7, 2007 (TW) .............................. 96146939 A

(51) Int. Cl.
*F16L 27/00* (2006.01)
(52) U.S. Cl. .................. 285/190; 285/276; 285/281
(58) Field of Classification Search ................. 285/190, 285/191, 277, 280, 273, 281, 276
See application file for complete search history.

(56) References Cited

U.S. PATENT DOCUMENTS

| | | | | |
|---|---|---|---|---|
| 386,881 A * | 7/1888 | Harris et al. | ............. | 285/147.1 |
| 2,307,328 A * | 1/1943 | Martin | .................. | 285/190 |
| 2,459,643 A * | 1/1949 | Hartley | ................. | 285/190 |
| 3,098,662 A * | 7/1963 | Iversen | ................. | 285/18 |
| 3,166,252 A * | 1/1965 | Williams et al. | ......... | 239/587.6 |
| 3,244,439 A * | 4/1966 | Montesi | ................. | 285/148.15 |
| 3,402,253 A * | 9/1968 | Mccracken | .............. | 174/86 |
| 4,362,324 A * | 12/1982 | Kelly | .................. | 285/119 |
| 4,672,998 A * | 6/1987 | Kozak, III | .............. | 137/614.04 |
| 4,775,174 A * | 10/1988 | Dalla Bona et al. | ......... | 285/190 |
| 5,248,250 A * | 9/1993 | Adachi | .................. | 425/547 |
| 5,372,389 A * | 12/1994 | Tam et al. | ................. | 285/94 |
| 5,533,764 A * | 7/1996 | Williamson | .............. | 285/212 |
| 5,607,189 A * | 3/1997 | Howeth | ................. | 285/39 |
| 5,636,877 A * | 6/1997 | Purvis et al. | .................. | 285/45 |
| 5,803,360 A * | 9/1998 | Spitznagel | .................. | 239/345 |
| 5,839,764 A * | 11/1998 | Heidelberger | .............. | 285/276 |
| 6,007,109 A * | 12/1999 | Schoetz | ................. | 285/190 |
| 6,056,325 A * | 5/2000 | Bernard | ................. | 285/39 |
| 6,070,917 A * | 6/2000 | Wiebe | .................. | 285/272 |
| 6,092,740 A * | 7/2000 | Liu | .................. | 239/346 |
| 7,337,990 B2 * | 3/2008 | Kurosaka et al. | ......... | 239/587.2 |

* cited by examiner

*Primary Examiner*—David E Bochna
(74) *Attorney, Agent, or Firm*—Alan Kamrath; Kamrath & Associates PA

(57) ABSTRACT

A quick connection unit for hydraulic or pneumatic tools includes a female part having an axial passage and a lateral tube. A fixing bolt extends into the axial passage, and the female part is pivotable about the fixing bolt along a Y-axis. A path is defined in the shank of the fixing bolt which is connected to the hydraulic or pneumatic tool. An L-shaped male part includes a horizontal tube and a vertical tube. The horizontal tube is rotatably connected to the lateral tube of the female part and communicates with the lateral passage in the lateral tube and the axial passage. The horizontal tube of the male part is pivotable about an X-axis of the lateral passage. A pipe is connected to an inlet of the vertical tube of the male part. The pipe can be rotated along the two axes relative to the hydraulic or pneumatic tool.

14 Claims, 7 Drawing Sheets

UNIVERSAL QUICK CONNECTION UNIT FOR CONNECTING PIPE TO HYDRAULIC OR PNEUMATIC TOOL

FIELD OF THE INVENTION

The present invention relates to a universal quick connection unit for hydraulic or pneumatic tools and which allows the pipe to be rotated in two different directions relative to the hydraulic or pneumatic tool.

BACKGROUND OF THE INVENTION

A conventional connection between a hydraulic or pneumatic tool 50 and a pipe 52 through which the pressurized air is delivered into the hydraulic or pneumatic tool 50 is shown in FIG. 1 and generally includes a male part 51 and a female part 53. The male part 51 is connected to the inlet of the hydraulic or pneumatic tool 50, and the female part 53 is removably connected to the male part 51. The pipe 52 is dragged, pulled, or even twisted during operation of the hydraulic or pneumatic tool 50. Since the female part 53 cannot be rotated relative to the hydraulic or pneumatic tool 50, the pipe 52 is easily twisted to affect the supply of the pressurized air into the hydraulic or pneumatic tool 50.

FIG. 2 shows another conventional connection between the hydraulic or pneumatic tool 50 and the pipe 64 by using a pivotable connection unit which includes a top section 60 having a threaded portion 61 so as to be connected with the hydraulic or pneumatic tool 50, a mediate section 63 and a lower section 62 which is pivotably connected to the mediate section 63. The pipe 64 is connected to the lower section 62, and the lower section 62 can be pivoted relative to the mediate section 63 in a range of 45 degrees. However, the range is far from satisfactory when using the hydraulic or pneumatic tool.

The present invention intends to provide a quick connection unit between the hydraulic or pneumatic tool and the pipe, wherein the pipe can be pivoted along two perpendicular axes so as to meet different requirements during operation of the hydraulic or pneumatic tool.

SUMMARY OF THE INVENTION

The present invention relates to a quick connection unit for hydraulic or pneumatic tools, and the connection unit comprises a female part having an axial passage defined therethrough and a lateral tube extending radially from the female part. A lateral passage is defined through the lateral tube and communicates with the axial passage. A fixing bolt extends into the axial passage, and the female part is pivotable about the fixing bolt along a Y-axis. A path is defined in the shank of the fixing bolt which is connected to the hydraulic or pneumatic tool. An L-shaped male part includes a horizontal tube and a vertical tube. The horizontal tube is rotatably connected to the lateral tube of the female part and pivotable about an X-axis of the lateral passage. The vertical tube includes an inlet which communicates with an interior of the horizontal tube and the lateral passage. A pipe is connected to the vertical tube.

The primary object of the present invention is to provide a quick connection unit for connecting a pipe to the hydraulic or pneumatic tool, wherein the pipe can be pivoted along two different axes relative to the hydraulic or pneumatic tool.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
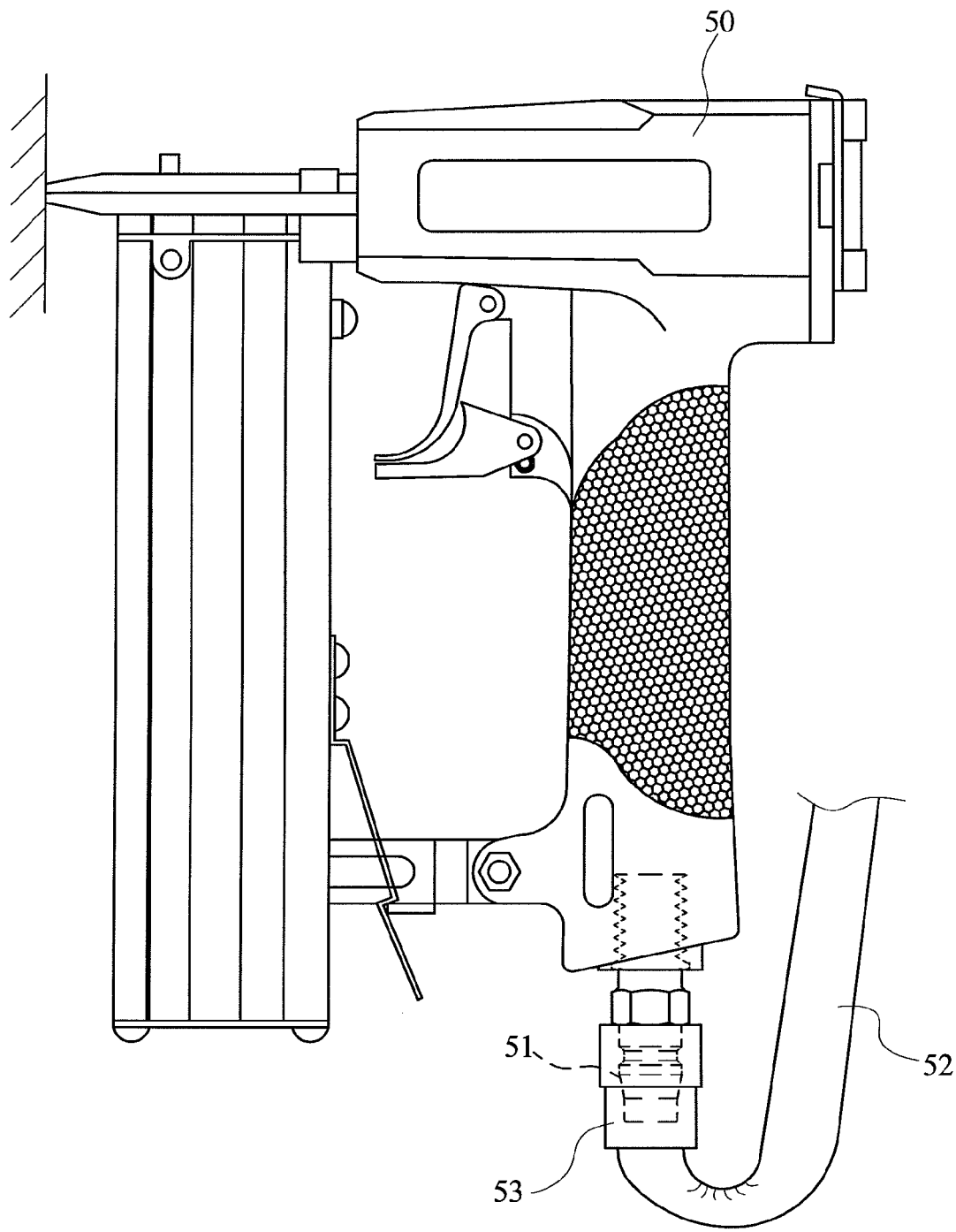
FIG. 1 shows a first conventional connection unit connected with a hydraulic or pneumatic tool.
Figure 2:
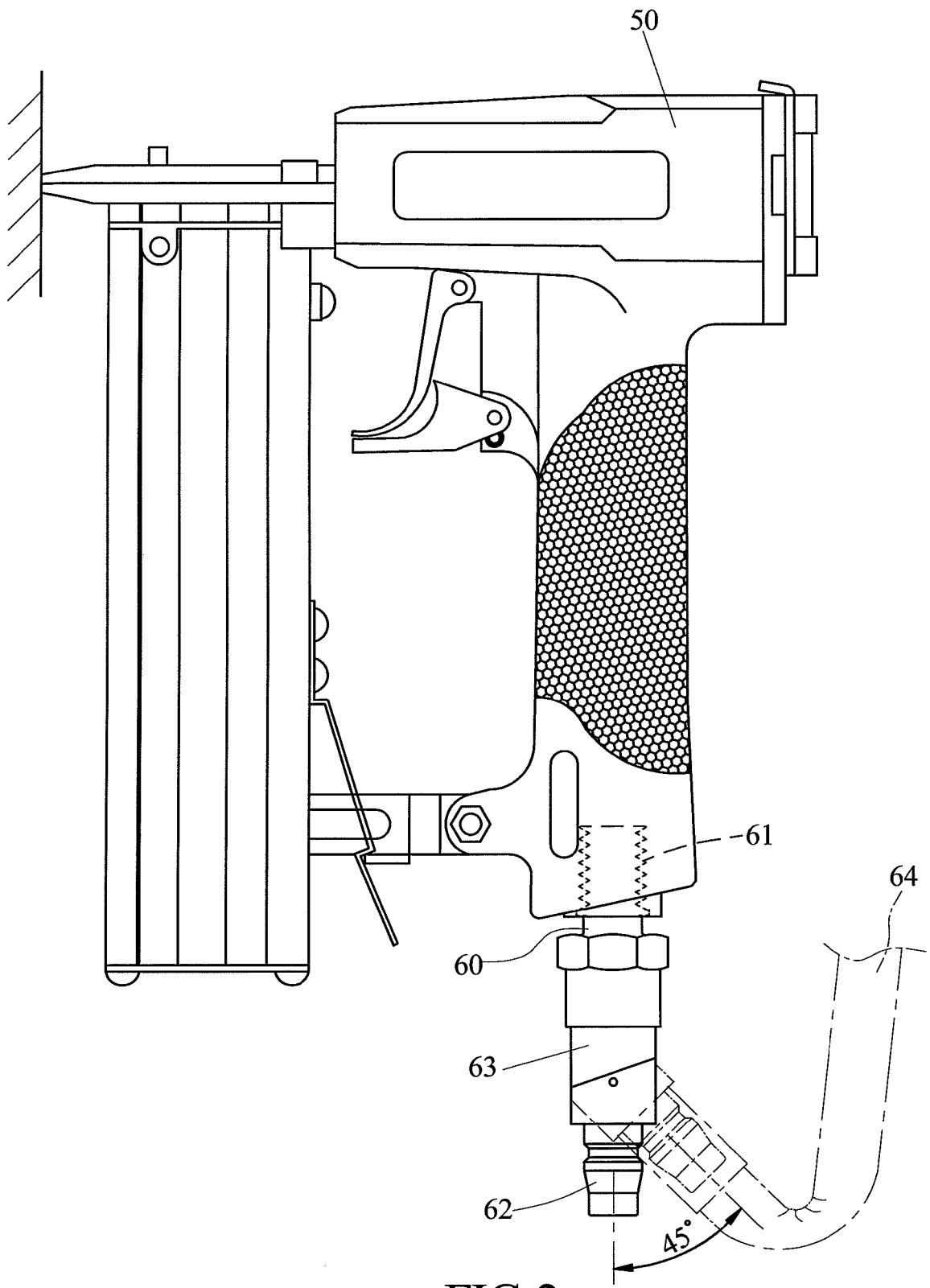
FIG. 2 shows a second conventional connection unit connected with a hydraulic or pneumatic tool.
Figure 3:
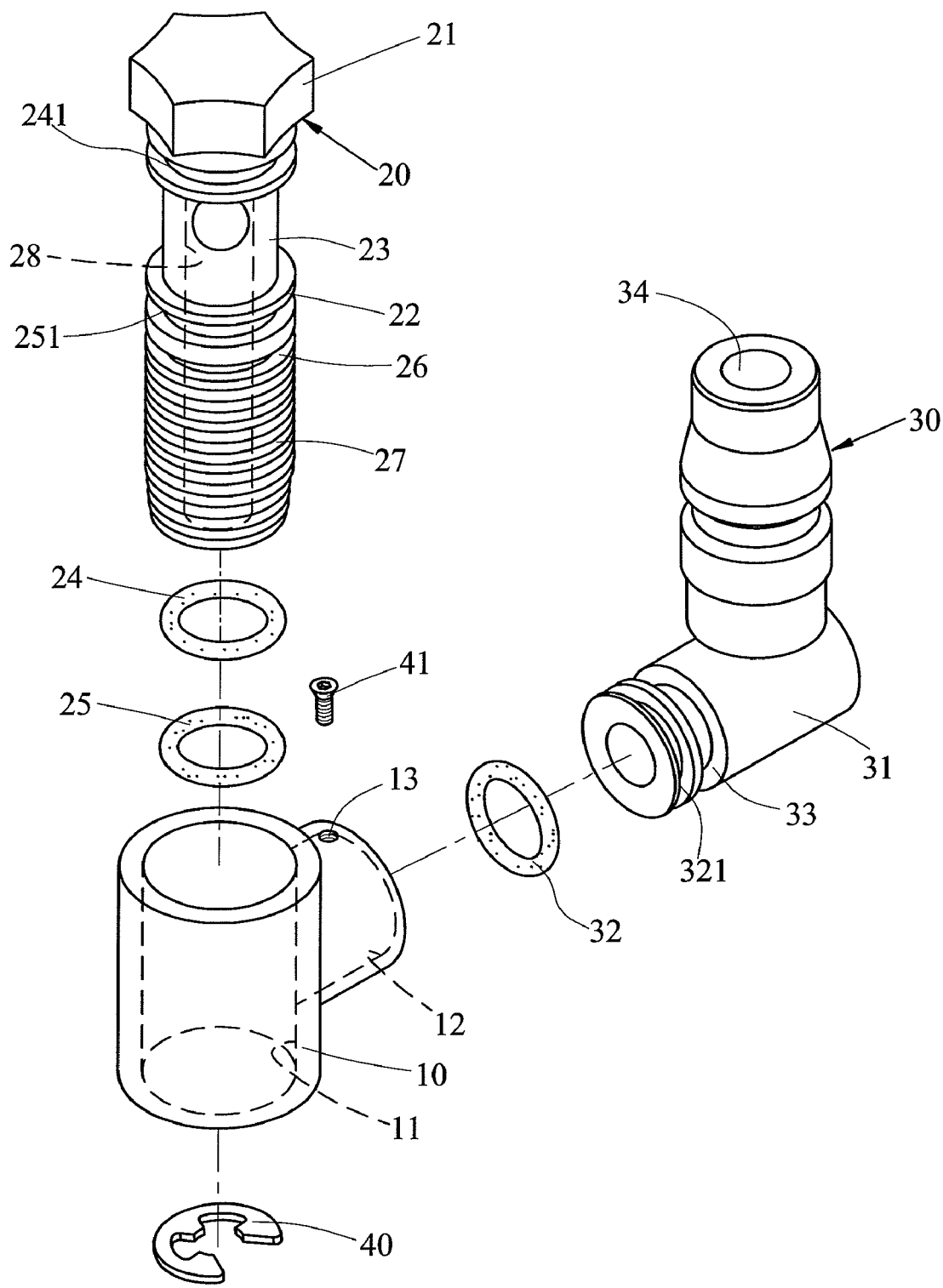
FIG. 3 is an exploded view to show the quick connection unit of the present invention.
Figure 4:
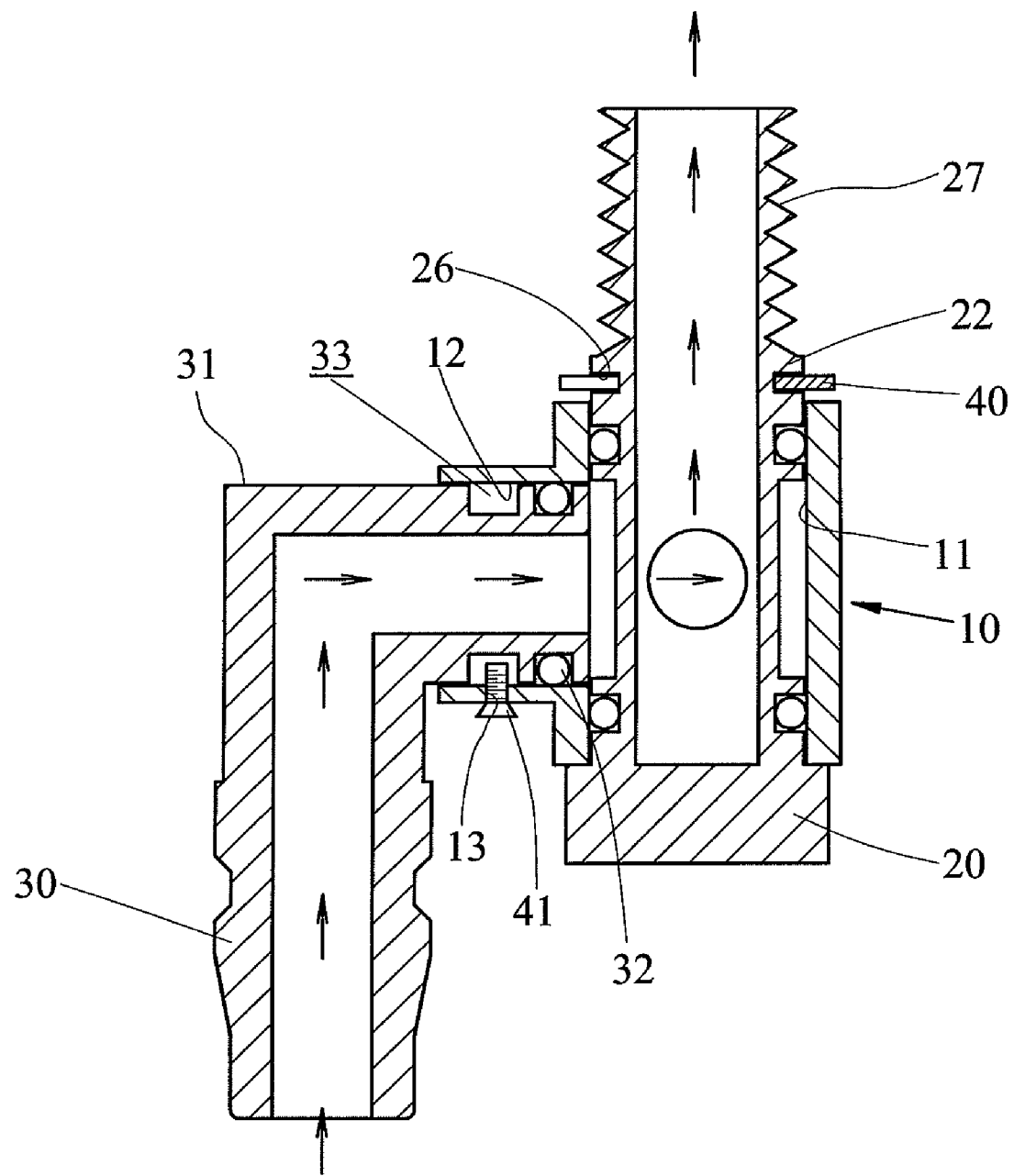
FIG. 4 is a cross sectional view to show the quick connection unit of the present invention.
Figure 6:
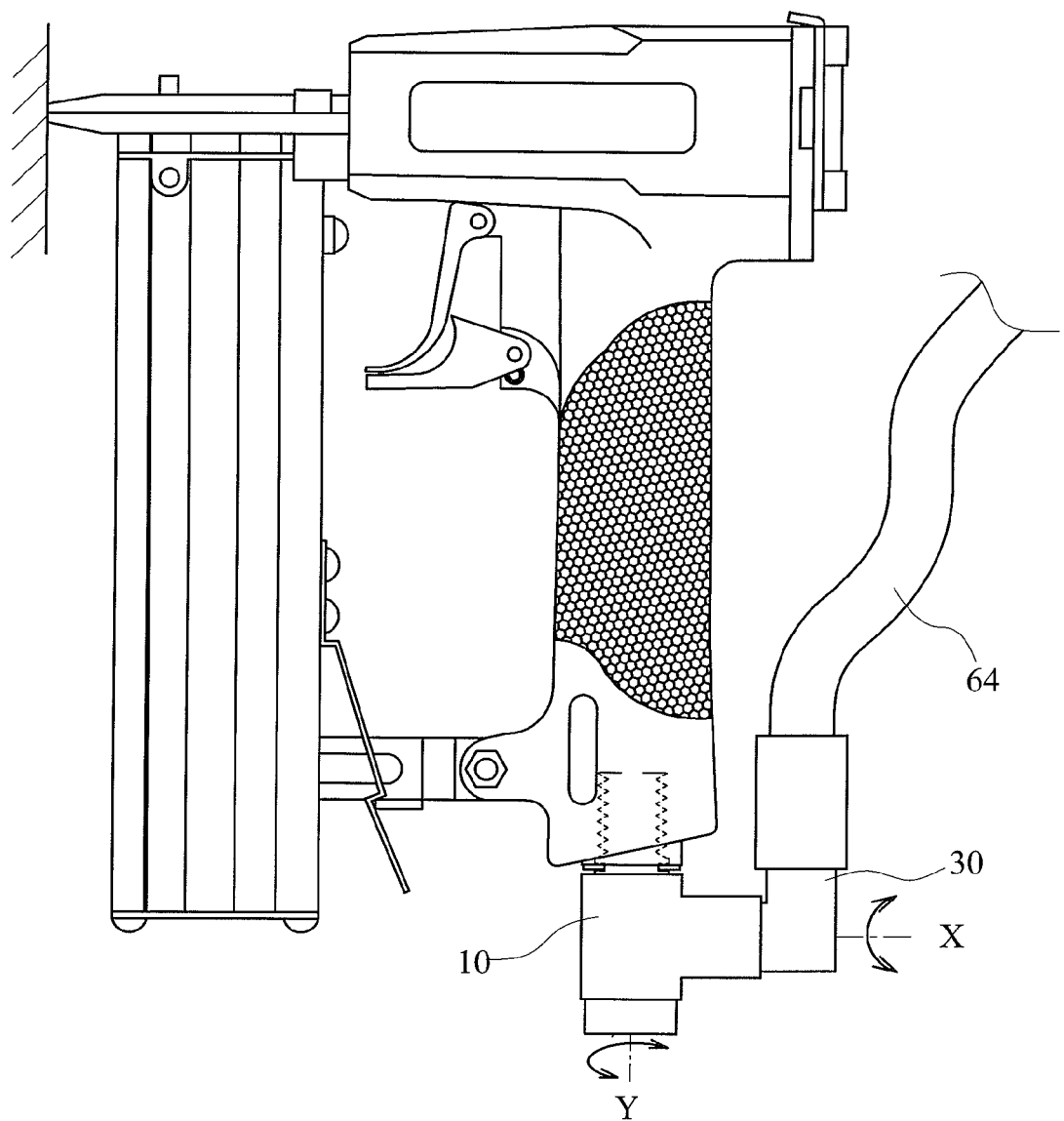
FIG. 6 shows that the quick connection unit of the present invention is connected to a hydraulic or pneumatic tool.

Referring to FIGS. 3, 4, and 6, the quick connection unit for connecting a pipe 64 to a hydraulic or pneumatic tool of the present invention comprises a female part 10 which has an axial passage 11 defined therethrough and a lateral tube extending radially from the female part 10. A lateral passage 12 is defined through the lateral tube and communicates with the axial passage 11. The lateral tube of the of the female part 10 includes a threaded hole 13 defined through a wall thereof.

The fixing bolt 20 includes a shank 22 and a head 21 on an end of the shank 22. The fixing bolt 20 extends into the axial passage 11 of the female part 10 and includes threads 27 defined in an outer periphery thereof so as to be connected with the hydraulic or pneumatic tool as shown in FIG. 6 The head 21 of the fixing bolt 20 is a polygonal head so that a tool can easily rotate the fixing bolt 20 to be connected with the hydraulic or pneumatic tool. The fixing bolt 20 includes an engaging groove 26 defined in the outer periphery thereof, and a clip 40 is engaged with the engaging groove 26. The clip 40 is located beyond an open end of the axial passage 11 of the female part 10. It is noted that the clip 40 can be any proper clip such as a C-clip, E-clip or coil-shaped clip.

The fixing bolt 20 further includes an annular recessed area 23 in the outer periphery thereof, and a path 28 is defined in the annular recessed area 23. A second sealing device is located on two ends of the annular recessed area 23. It is noted that the shank 22 includes an axial hole defined therein and opening to the distal end of the shank 22. The path 28 communicates with the axial hole. The second sealing device includes a first groove 241 and a second groove 251. The first and second grooves 241, 251 are defined in the outer periphery of the fixing bolt and located on two ends of the annular recessed area 23. Two O-rings 24, 25 are engaged with the first and second grooves 241, 251 so as to prevent leakage between the shank 22 and the female part 10. The female part 10 is pivotable about the shank 22 of the fixing bolt 20 along a Y-axis.

An L-shaped male part 30 includes a horizontal tube 31 and a vertical tube which is vertical relative to the horizontal section 31. The horizontal tube 31 is a rotatably inserted into the lateral tube of the female part 10 and communicates with the lateral passage 12. A first sealing device is located to the horizontal tube 31 of the male part 30. The male part 30 includes a third groove 33 defined in the horizontal tube thereof. A screw 41 extends through the threaded hole 13 in the lateral tube of the female part 10. A distal end of the screw 41 is located within the third groove 33 so that the horizontal tube 31 is not disengaged from the lateral tube of the connection bolt 20, while the horizontal tube 31 of the male part 30 is pivotable about an X-axis of the lateral passage 12. The first sealing device includes a fourth groove 321 defined in the horizontal tube thereof. An O-ring 32 is engaged with the fourth groove 321 to prevent leakage between the lateral tube of the female part 10 and the horizontal tube 31. The vertical tube includes an inlet 34 which communicates with a interior of the horizontal tube 31 and the lateral passage 12. The pipe 64 is connected to the vertical tube so as to deliver pressurized air from the compressor (not shown) into the hydraulic or pneumatic tool via the inlet 34, the horizontal pipe, the lateral passage 12, the axial passage 11 and the path 28. In this embodiment, the X-axis is perpendicular to the Y-axis.

Figure 5A:
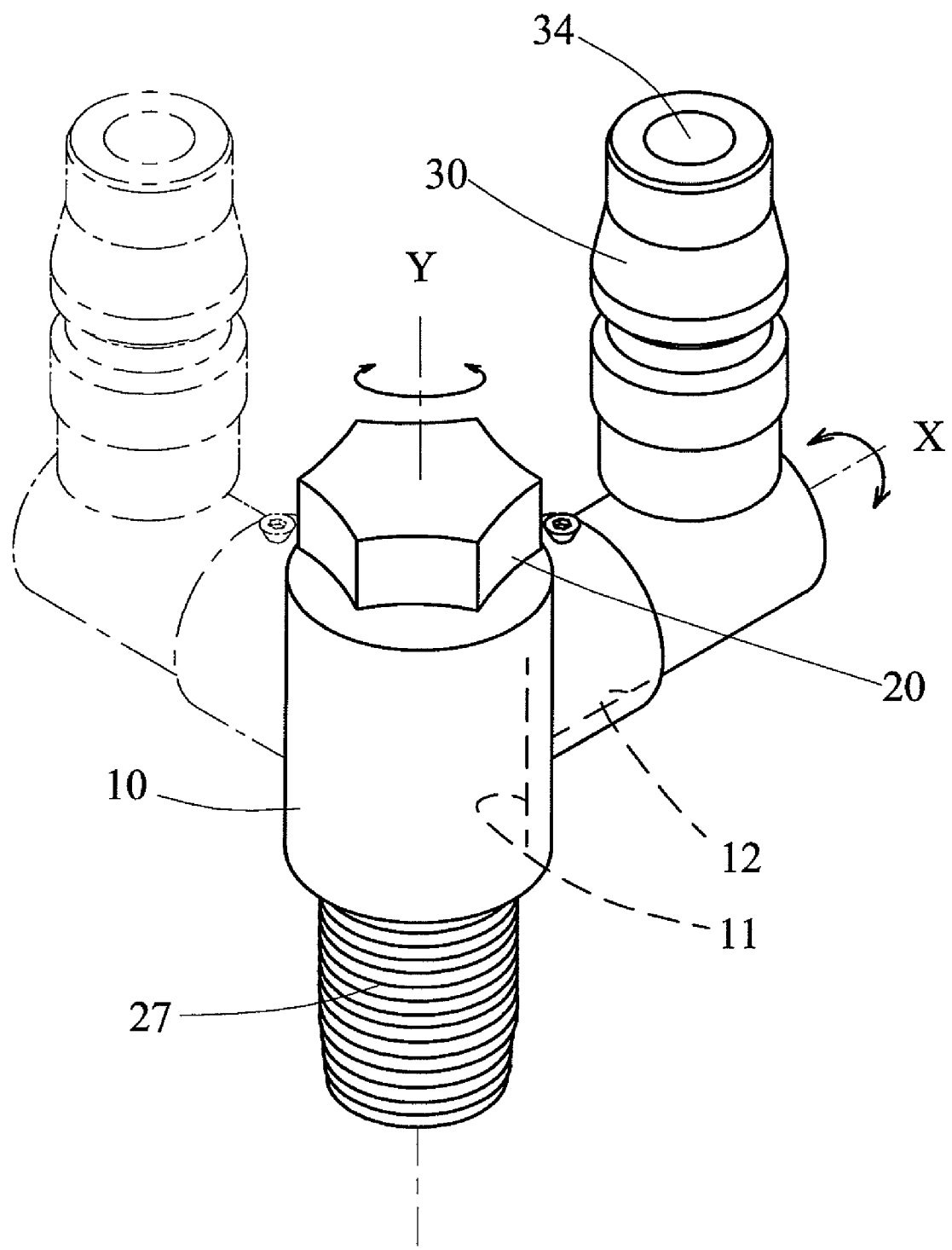
FIG. 5A shows that the female part is pivotable along the Y-axis.
Figure 5B:
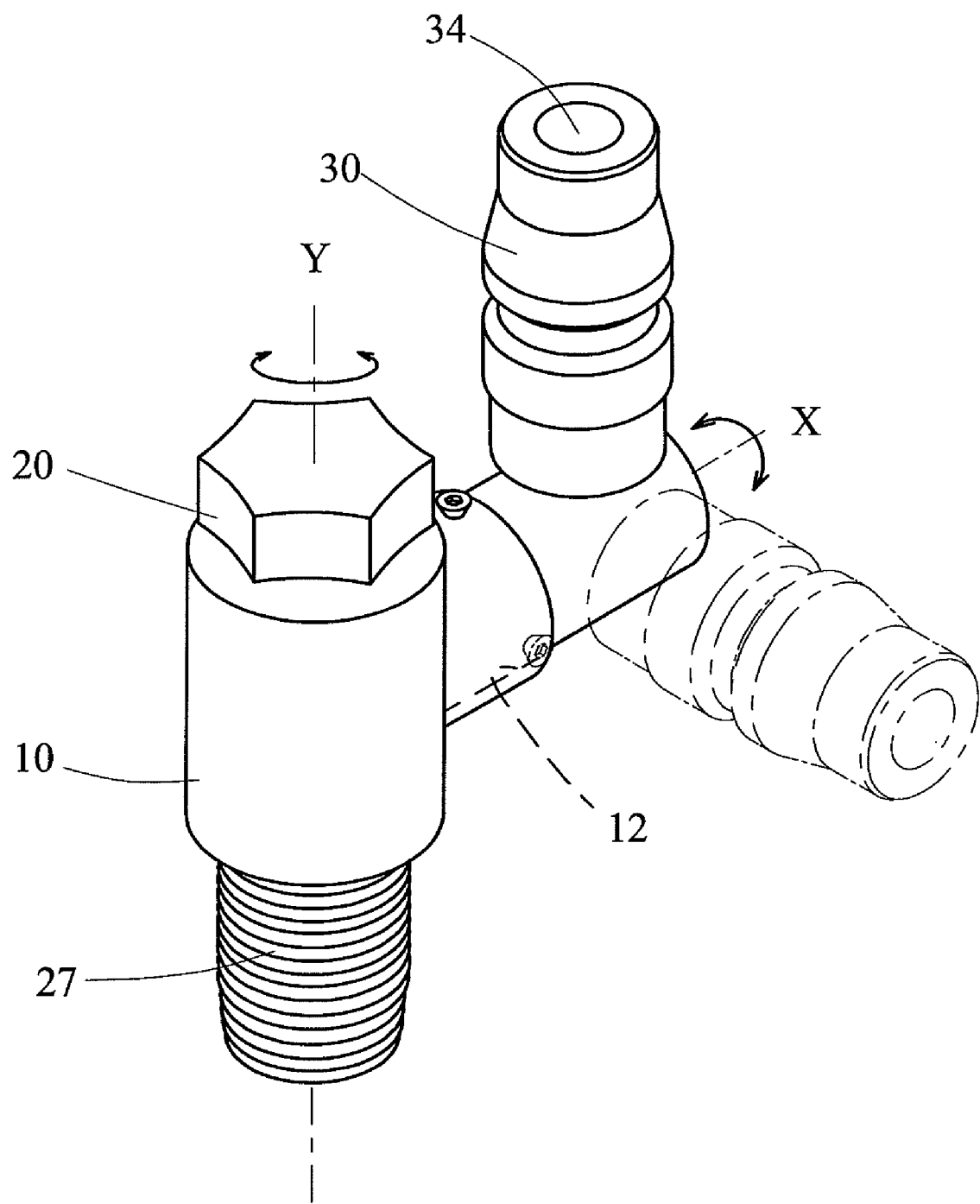
FIG. 5B shows that the male part is pivotable along the X-axis.

As shown in FIGS. 5A and 5B, the female part 10 is pivotable about the Y-axis and the horizontal tube of the male part 30 is pivotable about the X-axis. Thus, the pipe 64 is virtually pivotable in every direction.

The pipe 64 can be arranged by pivoting it along the X-axis and the Y-axis so that the pipe 64 can have optimal operation conditions without twisting, and the pressurized air can be steadily supplied to the hydraulic or pneumatic tool. The angular position of the quick connection unit according to the present invention provides more benefits when compared with the conventional connection units during operation of the hydraulic or pneumatic tool. The head 21 of fixing bolt 20 is located beyond the female part 10, and the user can easily rotate the fixing bolt 20 and does not damage the female part 10.

While the embodiment in accordance with the present invention has been shown and described, it should be clear to those skilled in the art that further embodiments may be made without departing from the scope of the present invention.

What is claimed is:

1. A quick connection unit for hydraulic or pneumatic tools, comprising:
    a female part having an axial passage defined therethough and a lateral tube extending radially from the female part, with a lateral passage defined through the lateral tube and communicating with the axial passage;
    a fixing bolt including a shank and a head on an end of the shank, with the fixing bolt extending into the axial passage and the female part being pivotable about the shank of the fixing bolt along a Y-axis, with a path defined in the shank which is adapted to be connected to the hydraulic or pneumatic tool; and
    an L-shaped male part including a horizontal tube and a vertical tube which is vertical relative to the horizontal section, with the horizontal tube rotatably connected to the lateral tube of the female part and communicating with the lateral passage, with a first sealing device located to the horizontal tube, with the horizontal tube of the male part pivotable about an X-axis of the lateral passage, with the vertical tube including an inlet which communicates with an interior of the horizontal tube and the lateral passage,
    wherein the fixing bolt includes an engaging groove defined in an outer periphery thereof and a clip is engaged with the engaging groove, the clip is located beyond an open end of the axial passage of the female part.

2. The quick connection unit as claimed in claim 1, wherein the head of the fixing bolt is polygonal head.

3. The quick connection unit as claimed in claim 1, wherein threads are defined in an outer periphery of the fixing bolt and adapted to be connected with the hydraulic or pneumatic tool.

4. The quick connection unit as claimed in claim 1, wherein the fixing bolt includes an annular recessed area, the path is defined in the annular recessed area, and a second sealing device is located on the fixing bolt and located on two ends of the annular recessed area.

5. The quick connection unit as claimed in claim 4, wherein the second sealing device includes first and second grooves defined in an outer periphery of the fixing bolt and located on two ends of the annular recessed area, and two O-rings are engaged with the first and second grooves.

6. The quick connection unit as claimed in claim 1, wherein the first sealing device of the male part includes a groove defined in the horizontal tube thereof and an O-ring is engaged with the groove of the first sealing device to prevent leakage between the lateral tube of the female part and the horizontal tube.

7. The quick connection unit as claimed in claim 1, wherein the X-axis is perpendicular to the Y-axis.

8. A quick connection unit for hydraulic or pneumatic tools, comprising:
    a female part having an axial passage defined therethough and a lateral tube extending radially from the female part, with a lateral passage defined through the lateral tube and communicating with the axial passage;
    a fixing bolt including a shank and a head on an end of the shank, with the fixing bolt extending into the axial passage and the female part being pivotable about the shank of the fixing bolt along a Y-axis, with a path defined in the shank which is adapted to be connected to the hydraulic or pneumatic tool; and
    an L-shaped male part including a horizontal tube and a vertical tube which is vertical relative to the horizontal section, with the horizontal tube rotatably connected to the lateral tube of the female part and communicating with the lateral passage, with a first sealing device located to the horizontal tube, with the horizontal tube of the male part pivotable about an X-axis of the lateral passage, with the vertical tube including an inlet which communicates with an interior of the horizontal tube and the lateral passage,
    wherein the L-shaped male part includes a groove defined in the horizontal tube thereof, the lateral tube of the female part includes a threaded hole, a screw extends through the threaded hole and a distal end of the screw is located within the groove so that the horizontal tube is not disengaged from the lateral tube of the connection bolt.

9. The quick connection unit as claimed in claim 8, wherein the first sealing device of the male part includes a groove defined in the horizontal tube thereof and an O-ring is engaged with the groove of the first sealing device to prevent leakage between the lateral tube of the female part and the horizontal tube.

10. The quick connection unit as claimed in claim 8, wherein the X-axis is perpendicular to the Y-axis.

11. The quick connection unit as claimed in claim 8, wherein the head of the fixing bolt is a polygonal head.

12. The quick connection unit as claimed in claim 8, wherein threads are defined in an outer periphery of the fixing bolt and adapted to be connected with the hydraulic or pneumatic tool.

13. The quick connection unit as claimed in claim 8, wherein the fixing bolt includes an annular recessed area, the path is defined in the annular recessed area, and a second sealing device is located on the fixing bolt and located on two ends of the annular recessed area.

14. The quick connection unit as claimed in claim 13, wherein the second sealing device includes first and second grooves defined in an outer periphery of the fixing bolt and located on two ends of the annular recessed area, and two O-rings are engaged with the first and second grooves.

* * * * *